Feb. 2, 1971  R. GIULIANI  3,561,001
MACHINE TOOL IN PARTICULAR FOR DRILLING METAL BEAMS
Filed Sept. 5, 1968  3 Sheets-Sheet 2

United States Patent Office 3,561,001
Patented Feb. 2, 1971

3,561,001
MACHINE TOOL IN PARTICULAR FOR DRILLING METAL BEAMS
Renato Giuliani, Milan, Italy, assignor to Fabbrica Italiana Cesoie e Punzonatrici Colombo-Guiliani di Colombo & C.S.a.S., Milan, Italy
Filed Sept. 5, 1968, Ser. No. 757,540
Claims priority, application Italy, Sept. 7, 1967, 20,234/67
Int. Cl. B23b 39/14
U.S. Cl. 77—31          8 Claims

ABSTRACT OF THE DISCLOSURE

A method and machine tool for drilling the surfaces of metal beams, wherein a single work head is moved around the beam by a suitable supporting and adjustable frame. In such a manner, the tool or tools of the work head can be readily positioned in front of the different beam surfaces to be machined without any need to turn the beam.

BACKGROUND

This invention relates to a method and a machine tool for machining and in particular for drilling metal beams, as e.g. I, U, L-shaped beams and the like, as usually utilized in building appliances.

Different machine tools have been recently proposed to perform such machining operations. Such machines are adapted to automatically perform said beam drilling operations by means of drilling assemblies in which a plurality of work heads carrying punches or drills are suitably arranged in such a manner that each side of the beam to be machined is operated by at least one of said work heads. Such machines really reduce the time and effort required for such machining operations; however they are very expensive, owing to the necessity for providing a plurality of work heads along with related driving means.

A machine having a single work head, fitted to a frame in front of which a differently positioned beam to be machined is fed, has been proposed to overcome the above drawbacks. In such a case, all required drilling operations are firstly performed on one side of beam; the beam then being overturned to allow all other drilling operations to be performed on the remaining sides. The drawbacks of such method will be obvious when considering the heavy weight of such beams and thus the equipment and time required for overturning the same. Moreover, after having machined one side of beam and before overturning the same, it is necessary to bring it away from the tool area, always in the same direction in respect thereof, in order to limit the damages caused by the overturning impact to one bearing bed only and to preserve the size accuracy of the other bearing bed, as required for such machining operations. This fact obviously involves a further loss of time.

SUMMARY

This invention obviates the abovestated drawbacks of the latter mentioned machine tools, by the provision of a method for machining the stated beams such that, while the costs of, the machine tool by which such method is carried out substantially equal that of the just described single head machine, the machining time is however of the same order as that of the multi-head machines and shorter than that of machines having a single, stationary work head, the requirements of labor and auxiliary equipment being further minimized.

According to the invention, the method by which the above advantages are obtained in the machining and in particular in the drilling of the various plane surfaces of respective metal beams lying on a supporting or sliding plane, by means of a machine tool having at least one work head, is essentially characterized in that said work head, in order to operate on said plane surfaces of each beam, is shifted, oriented and positioned in such a way as to be brought each time in front of the single surfaces to be machined, the beam being maintained always in the same initial lying position during the machining operations.

The machine tool by which the abovestated method is carried out is characterized in that it comprises a portal-shaped frame surrounding the beam to be machined and fitted with guide means by which the single work head can be shifted and positioned within a plane perpendicular to main axis of beam and around said axis. According to a preferred embodiment, said work head is supported by an annulary shaped member that can be turned on suitable guides within said plane, whereby the work head is brought into any required position across an arc extending substantially for 180 degs. starting from a plane parallel to or coinciding with the plane wherein the beam to be machined lies, and around an axis coinciding with or parallel and close to main axis of said beam to be machined, said axis and said plane being respectively coincident with the axis of said annular element and with the horizontal plane wherein said axis lies.

The above and further details and features of this invention will be now disclosed in the following description of a preferred embodiment of a machine tool by which the method according to the invention is carried out, and that is shown in the accompanying drawings, along with a schematic diagram referring to the machining process that is carried out therein, both description and drawings being given as a non-restrictive example of the invention.

DRAWING

FIG. 4 is a front view on a reduced scale, of the same assembly.

Figure 5:
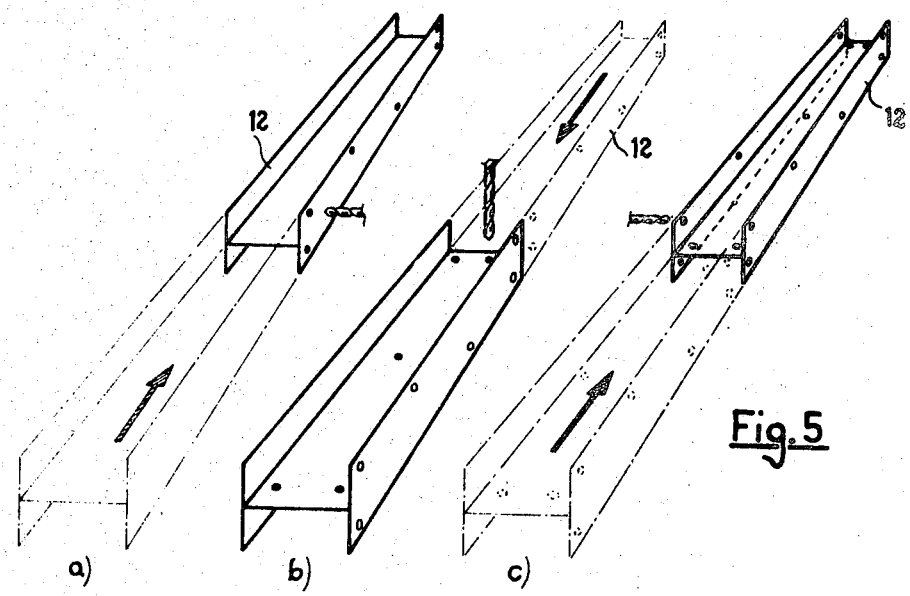

FIG. 5 diagrammatically shows, as an example only, the main steps of a drilling process as carried out according to the invention on a I-shaped beam.

PREFERRED EMBODIMENT

Figure 1:
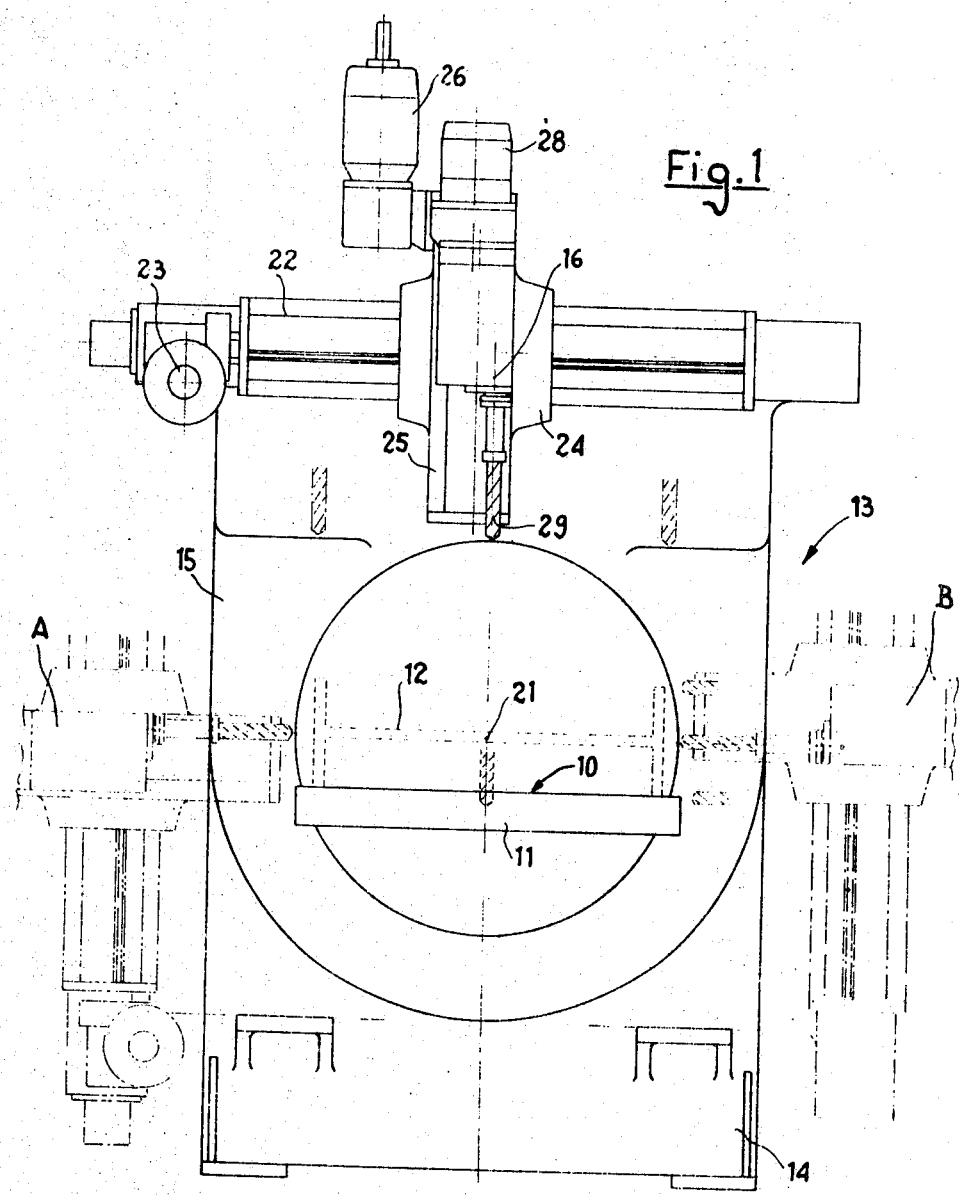
FIG. 1 is a front view of a machine tool according to the invention, particularly designed for drilling metal beams.
Figure 2:
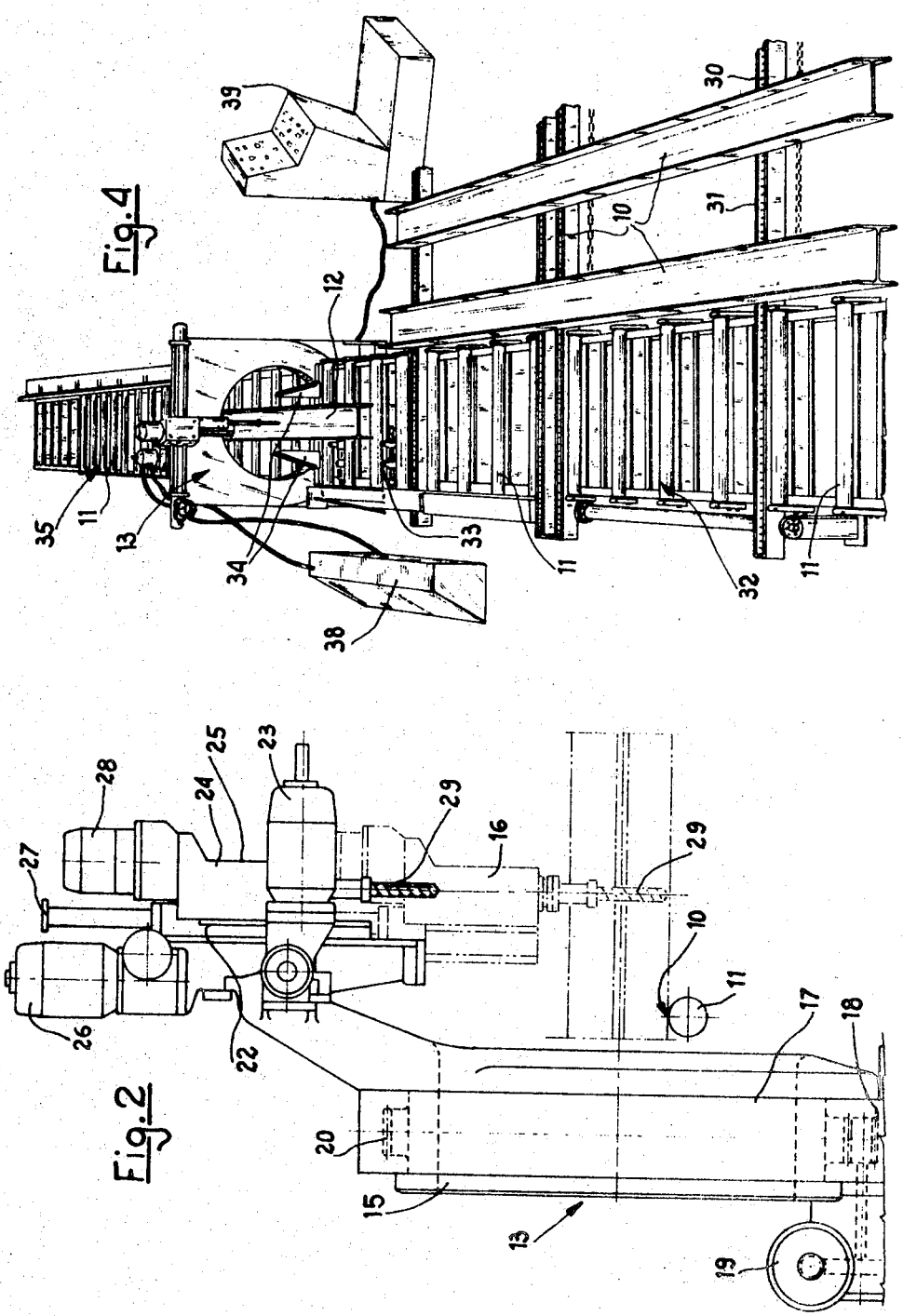
FIG. 2 is a side view of the machine tool of FIG. 1.

Referring to the drawings and firstly to FIGS. 1 and 2 thereof, the machine tool comprises, in the already known manner, a bearing bed 10 consisting of guide rollers 11, whereon the beam 12—e.g. at I-shaped beam—is positioned, a stationary or movable portal shaped frame 13, by which the tools are carried, being provided in a position along said bearing bed 10.

Said portal frame 13 comprises, as shown in FIGS. 1 and 2, a base 14, that can be either stationary or longitudinally movable along the main axis of the beam to be machined, due to reasons which will be explained below. Rotatably supported on said base 14 is a substantially annular-shaped structural support mmeber 15, acting as a supporting frame for a single work head 16 that is suitably fitted thereon. In more details, fitted on the base 14 are guide means 17 for guiding said annular member 15, and a pinion gear 18 which is driven by a driving motor 19 and is in mesh with a gear wheel 20 that is circumferentially formed on said annular member 15. Thus, the member 15 can be turned in the vertical plane wherein it lies around the related axis 21, that is coincident with the main axis of beam 21 or is parallel and close thereto, the beam 12 and the related machine bed 10 thereby being entirely surrounded by said annular member 15. Fitted on the top of latter member 15 is a first tool guide 22, that in the position shown with solid lines in FIG. 1 lies in a horizontal plane and whereon a slide 24, driven by the motor 23, is slidingly fitted. The work head 16 is in turn slidingly fitted on a second vertical tool guide 25 formed in said slide 24. The work head 16 is moved along its guide 25 by a driving motor 26, while the feed and rotary motions thereof are respectively imparted by a hydraulically operated cylinder-piston assembly 27 and by a motor 28.

With the stated arrangement it is possible to perform the required drilling operations or even other machining operations, utilizing a single work head, without any need for overturning the beam each time the surface to be machined lies in a different plane. In fact, by suitably turning the member 15, the work head 16 can be brought exactly in front of any one of the beam surfaces to be machined, preferably in such a manner that the feeding motion of the tools 29 be essentially perpendicular to said beam surface. Said rotary motion should preferably extend across a 180 degs. or greater arc, starting from the diametral horizontal plane of the ring member 15, e.g. between the end stroke operating positions A and B, as shown by dotted lines in FIG. 1. Moreover, the possibility is given to perform drilling or other machining operations not only on beam surfaces parallel or perpendicular to the surface whereon the beam lies, but also on beam surfaces having any orientation, by sutiably and controllably turning the member 15. Once the work head 16 is brought in front of the required beam surface, it may be further adjusted in its position by driving the slide 24, through the motor 23 along the tool guide in a direction parallel to said beam surface, to thereby bring the drill 29 into the required longitudinal position. In addition, the work head 16 can be selectively brought near to or away from the beam surface to be machined by means of motor 26 and along the guide 25, whereby said work head can be easily and quickly positioned relative to the beam, which results in a lesser expense than that of the multi-head machine tools and in an easier operation than that of machines having one stationary work head. The hydraulic and electric connections between a stationary control panel and said different movable elements fitted on the member 15 are established by means of flexible cables and pipes which can follow the motion of the work head without interfering with the beam machining operations, said cables and pipes being guided by already known means, as e.g. pulleys and the like which effect a reliable and safe connection between the stationary control panel and the drive means movable together with the member 15.

The motions of the tool or tools 29 in a direction longitudinal to beam 12 can be obtained either by shifting said beam or by shifting the portal frame relative to the beam, which in the latter case is kept stationary on the machine bed. A selection between said two methods essentially depends on the sizes and thus on the weight of beams to be machined. When the beams are particularly heavy and thus difficult to move, recourse is preferably made to shifting of the portal frame 13, not withstanding the structural complications that may ensue therefrom.

In the following description, referring to the whole assembly shown in FIGS. 3 and 4, it will be assumed that the beam is moved, as it is more convenient in the most of cases, while the base 14 of the portal frame 13 is kept stationary relative to the machine base.

The stated assembly, that is shown in more details in FIG. 4, comprises in addition to the portal frame 13, which components have been already described, and to the machine bed 10, that is formed by the rollers 11, a loading bed 30 fitted with feeding chains 31, by which the beams are fed to inlet table 32. Said table 32 carries the rollers 11 and adjustable motion limiting stop means 33 for positioning the beams, which are then more accurately adjusted before the machining operations are started by means of a clamping device 34, located close to the portal frame 13. An outlet table 35, also consisting of rollers 11, and a discharge chain type bed (not particularly shown) are arranged downstream relative to said portal frame 13. Slidingly fitted on the outlet table 35 is a beam shifting device 36, which operation can be controlled and adjusted in such a manner as to allow an accurate layout of the beam portion to be machined in the operation area of the tools. Said shifting device, of the already known type, comprises gripping pliers 37 or other beam gripping means by which the beam placed on the inlet table is gripped and longitudinally shifted in either direction, in order to bring the different points of the various surfaces to be machined in front of the tool or tools. Obviously, when the portal frame 13 is shifted, instead of the beam, motor means adapted to impart the required motions to said frame would substitute said shifting device. Said motions of the shifting device, as well as the possible motions of the member 15 and the work head positioning motions could be automatically controlled, e.g. through a punched tape program or the like in a centralized control station 38 (see FIG. 4) having a control panel 39

Figure 3:
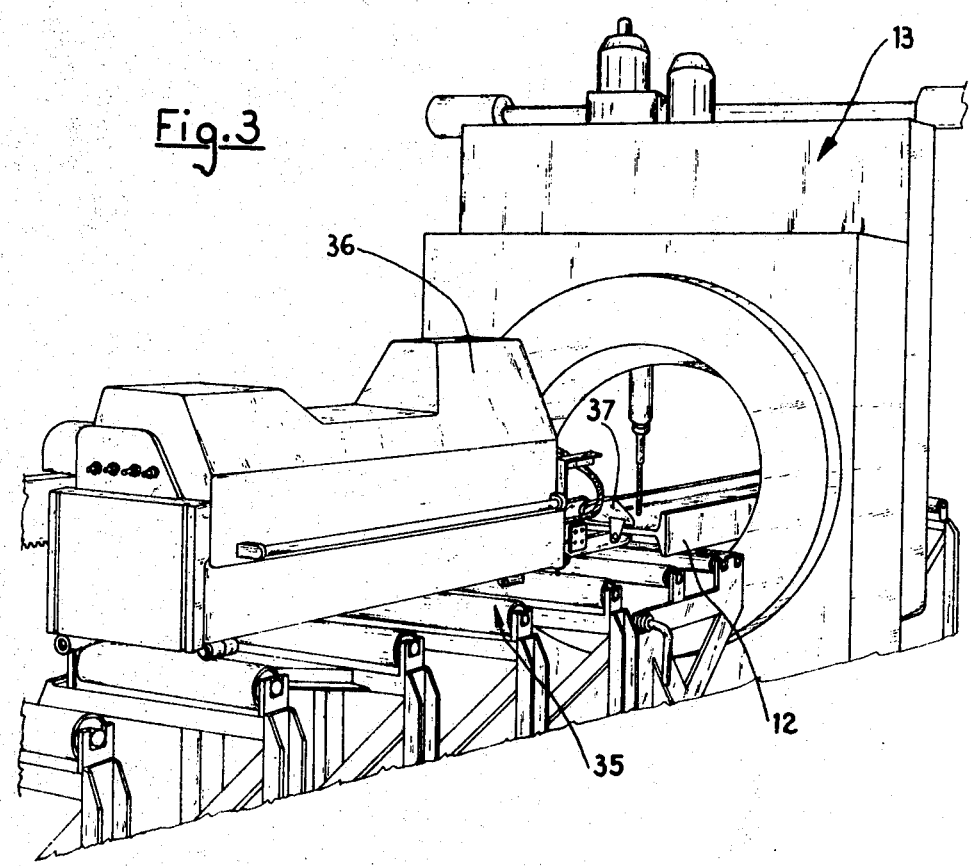
FIG. 3 is a rear view of the whole assembly designed for drilling metal beams according to the invention.

The operation of a machine tool according to the invention, e.g. of the type as shown in FIGS. 3 and 4, is essentially as follows:

The beams 40 to be machined are brought, according to a pre-established sequence and through the chain loading bed 30, onto the inlet table 32 and against the stop means 33, whereafter each beam is gripped by the pliers 37 of the shifting device 36 and brought in front of tool or tools 29 carried by the work head 16, that may be positioned in front of the right side flange of an I-shaped beam 12 to be machined. By successive shiftings, preferably controlled by said punched tape, the different beam areas to be drilled are brought by the shifting device 36 in front of the tool 29, thereby completing the machining of said beam flange as shown in FIG. 5a.

At the end of such machining step, the work head 16 is turned by a suitable angle, e.g. of 90° in the considered case, and the beam is successively moved by the shifting device 36 in an opposite direction, to allow for the machining of the beam web, as shown in FIG. 5b.

After the beam web has been drilled, the work head 16 is further turned over an angle of 90° or other suitable angle, to drill the opposite I-shaped beam flange, the beam moved in an opposite direction being coincident with that of the first pass (FIG. 5c). As the drilling operations are completed, the beam lies on the outlet table 35 wherefrom it can be quickly removed, while the shifting device 36 comes back again to grip the next beam 12 in order to minimize the idle periods. Obviously, in each beam area to be drilled it is possible to provide for an adjusting motion of the work head 16 in a direction parallel to the related beam surface, while said work head 16 can be drawn near to or away from the surface to be machined, e.g. in the considered particular case as a consequence of turning said work head from a horizontal position to a vertical position and vice-versa.

As previously stated, the invention covers also an arrangement of means by which the beam 12 is kept stationary in its position and the advance or feeding motion in the longitudinal direction of the beam is performed by the portal frame 13, in this latter case the drilling process being carried out in the same way as previously described, except that the beam 12 is kept stationary on a single machine bed, across which said portal frame 13 is moved in a manner substantially similar to that previously described.

It is to be observed that according to a different embodiment not shown of the present invention, the work head 16 may be moved in any different suitable manner, provided that it can be positioned in front of the different beam surfaces to be machined, as shown by the various beam shapes that can be handled in the machine. Thus the work head may be moved along two vertical guides located sidewise relative to the beam and along an upper horizontal guide, said guides being connected with each other by means allowing a convenient turning of the work head and possibly of its supporting means.

While the invention has been described in detail, it is to be understood that the description is given for the purpose of illustration only; and many changes and variations in the details and arrangement of parts may be made without departing from the scope of the invention as defined by the appended claims.

I claim:

1. Apparatus for machining an article having a plurality of surfaces, said apparatus comprising a base, an annular support having an axis of rotation, means for rotatably connecting said annular member to said base for rotation about said axis of rotation thereof, tool carrying means, means connecting said tool carrying means to said annular support for movement of said tool carrying means in a first direction and in a second direction transversely of said first direction, said first and second directions being transverse of said axis of rotation of said annular support, first drive means for rotating said annular support obout said axis of rotation thereof, second and third drive means for moving said tool carrying means in said first and second directions respectively, loading and unloading means for moving said article to and away from said tool carrying means through said annular support in a direction parallel to said axis of rotation thereof, and shifting means for moving said article selectively relative to said tool carrying means to place a selected portion of said article opposite said tool carrying means, whereby said first, second and third drive means selectively move said annular support and said tool carrying means opposite selected surfaces of said article to machine said article.

2. Apparatus as claimed in claim 1, wherein said loading and unloading means includes a horizontal tabel extending on opposite sides of said annular support, said horizontal table including a plurality of spaced rollers for carrying said article to, through, and away from said annular support.

3. Apparatus as claimed in claim 2, wherein said loading means includes feeding means for feeding said article onto said rollers.

4. Apparatus as claimed in claim 3, wherein said rollers have an axis of rotation, said feeding means being adapted for feeding said article onto said rollers parallel to said axis of rotation of said rollers.

5. Apparatus as claimed in claim 1, wherein said loading means includes adjustable stop means engageable by said article for adjusting the position of said article prior to the machining thereof.

6. Apparatus as claimed in claim 1, wherein said loading means includes clamping means for securely clamping said article prior to the machining thereof.

7. Apparatus as claimed in claim 1, wherein said shifting means includes gripping means for gripping said article as said article is shifted thereby.

8. Apparatus as claimed in claim 1, including control means for controlling said first, second, and third drive means in accordance with a prescribed machining program.

References Cited

UNITED STATES PATENTS 2,042,720   6/1936   Lindner _____ 77—31X

FOREIGN PATENTS 591,712   1/1934   Germany _____ 77—31

FRANCIS S. HUSAR, Primary Examiner

U.S. Cl. X.R.

77—5